United States Patent

Shellabarger

[15] 3,690,794
[45] Sept. 12, 1972

[54] TIRE BEAD SEALING AND SUPPORTING MEANS FOR RETREADING MOLD

[72] Inventor: Donald Elston Shellabarger, 1110 Mac Nichol Lane, Chattanooga, Tenn. 37421

[22] Filed: Aug. 1, 1969

[21] Appl. No.: 846,824

[52] U.S. Cl. ..................425/21, 425/24, 425/38, 425/90
[51] Int. Cl. ...........................................B29h 5/04
[58] Field of Search.............................18/18 F, 45 T

[56] References Cited

UNITED STATES PATENTS

| | | |
|---|---|---|
| 2,077,506 | 4/1937 | Woock..........................18/18 F |
| 2,866,228 | 12/1958 | French..........................18/18 F |
| 2,871,514 | 2/1959 | White...........................18/1 BF |
| 2,903,741 | 9/1959 | White............................18/45 T X |
| 3,135,996 | 6/1964 | Sinyser..........................18/18 F |
| 3,195,179 | 7/1965 | Laube............................18/2 TP |
| 3,238,982 | 3/1966 | Darr.............................157/13 X |

Primary Examiner—J. Howard Flint, Jr.
Attorney—Wynne and Finken

[57] ABSTRACT

An apparatus is provided for retreading tires without the use of an air bag or tube. Sound fluid tight integrity during initial tire inflation is provided by a bead seater means, preferably in the form of an internal annular belt which presses the tire beads against outer rims to produce a sealing engagement. Inflation air passes through a valve in one of the rims and through the bead seater means into the tire.

2 Claims, 5 Drawing Figures

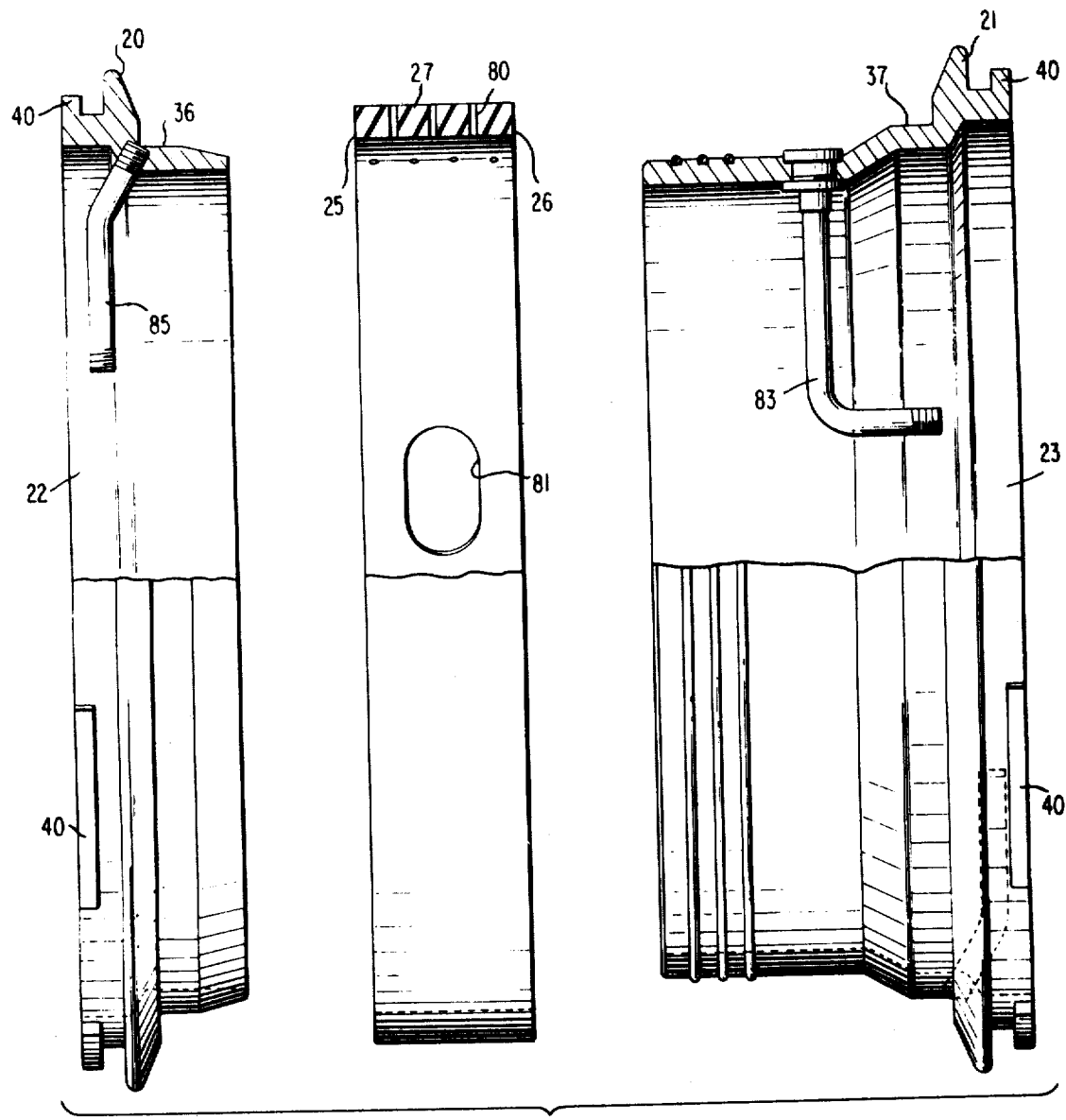
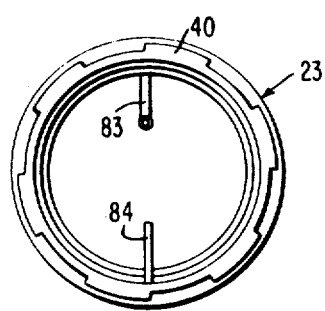
FIG.1
FIG.2
INVENTOR
DONALD ELSTON SHELLABARGER

Patented Sept. 12, 1972

TIRE BEAD SEALING AND SUPPORTING MEANS FOR RETREADING MOLD

This invention relates to the retreading of tires and particularly to a means for sealing the beads of a tire in a conventional retreading mold in a manner which enables inflation of the tire without a tube.

An example of equipment requiring a tube is shown in the 1958 U.S. Pat. No. 2,866,228 to E. E. French. This invention provides replacement bead engaging rims and a bead seater means for equipment of this type; the inflation tube is eliminated.

Increased efficiency in operation is available with this invention since the tube need not be inserted and the problem of the tube sticking to the tire is eliminated. The expense of replacing worn tubes is eliminated.

It is recognized that tubeless retreading equipment is not new. However, the problem of providing a fluid or air-tight seal has presented operational difficulties which apparently have prevented acceptance by the industry.

This invention provides a kit for conversion of the type equipment shown in U.S. Pat. No. 2,866,228; the cost of such conversion is low; the seal produced is sound; and operational and maintenance costs are reduced significantly.

The two telescoping rims which engage the tire beads have an O-ring seal at the telescopic joint. Each tire bead is forced against a rim flange by the bead seater means to produce an initial fluid tight seal. The bead seater means is preferably of a flexible material such as rubber, plastic, leather, etc. to facilitate insertion between the beads and has an inside diameter larger than the telescoping rim tube portions to define therewith an annular fluid conduit for annularly conducting air from a valve stem on a rim to openings in the bead seater means to enable tire inflation. This eliminates the necessity for aligning a single opening, when employed, in the ring with the valve stem and speeds up the operation.

Bead breakers are provided in the form of air tubes in each rim.

Alternatively, the rims may be coated with Teflon or some similar low friction material to facilitate tire removal.

Further objects and advantages of the invention will be apparent from the following description taken in conjunction with the accompanying drawing wherein:

FIG. 1 is an exploded view of the two rims and a bead seater means showing two forms for initial inflation air entry into the tire, one being an enlarged opening and the other being a foraminous belt with small passages throughout its entire length;

FIG. 2 is an outer end view on reduced scale of the larger rim;

Figure 3:
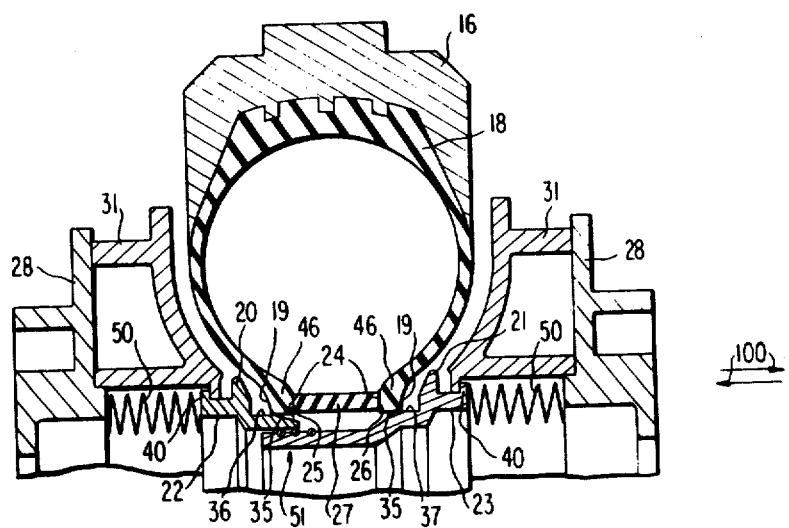
FIG. 3 is a cross sectional view of the three parts mounted in a standard retreading equipment with the tire beads positioned for firm seating on the annular bead flanges when the rims are moved into engagement therewith.
Figure 4:
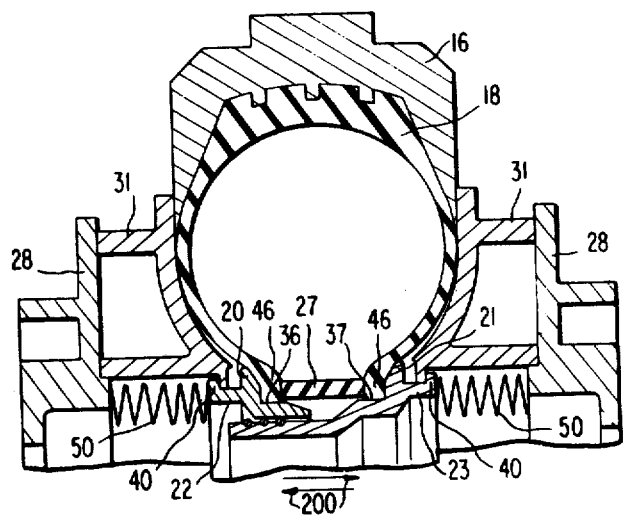
FIG. 4 shows the rims in final seating position with the telescopic joint sealed and the tire beads forced by the bead seater means into sealed engagement with the rims awaiting initial inflation.
Figure 5:
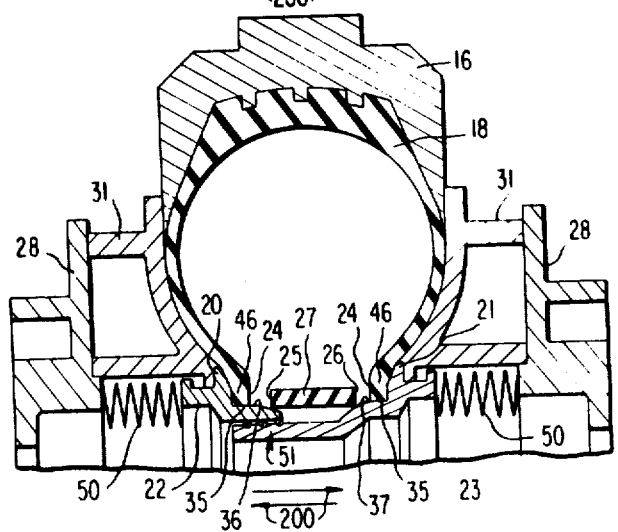
FIG. 5 shows the tire in its final inflated and aligned position.

The replacement rims 22 and 23 and the bead seater means 27 which replaces the tube are shown in FIGS. 1 and 2. As seen in FIGS. 3 to 5, a typical retreading unit of the type mentioned includes annular pressure plates 28, 28, and fixedly attached side wall members 31, 31, which are moved toward and away from matrix 16.

Matrix 16 is suitably mounted in arcuate sections on a frame for swinging into position around the tire 18. Suitable moving means such as shown in U.S. Pat. No. 2,866,228 are incorporated herein by reference as indicated in part by arrows 100.

The beads 46, 46 of the tire 18 are engaged at their outer radial side faces 19, 19 by annular bead flanges 20, 21 of rims 22, 23 respectively. The inner radial side faces 24, 24 of the beads are engaged by the radial faces 25, 26 of the bead seater ring 27. The annular end faces 35, 35 of the beads seat on the annular seats 36, 37 of the rims.

The bead seater ring 27 may be constructed of leather belt material so that it has some resilience and can be flexed for insertion into position between the beads of the tire.

Each cylindrical rim 22, 23 has an outer series of radial mounting ears 40 which mate with similar mounting ears 36 of the side wall members 31.

Suitable means, when desired, are provided in the standard equipment mentioned for axially sliding the rims 22 and 23 with respect to the side wall members 31, the ears 40 of each rim being biased by adjustable springs 50 into engagement with ears 36. When the tire is inflated, the rims move outwardly against the predetermined bias (arrows 200) until their bead flanges 20, 21 engage their respective ears 36 at which time, the two beads 46 will be in accuate firm contact with the concentric rims and in the desired predetermined position for retreading.

FIG. 3 shows the parts assembled and ready for the final inward tire embracing movement of the side wall members 31 and the rims 22, 23.

FIG. 4 shows the side wall members 31 in contact with the matrix 16, the rims 22 and 23 in their inwardly biased position, and the tire beads 46 firmly forced by the ring 27 into fluid sealed engagement with the bead flanges 20 and 21. The fluid tight telescopic joint 51 is in an established condition.

Inflation then takes place.

Certain equipment designs would involve no outward movement of its rims before retreading. However, alignment advantages appear to reside in designing the rims 22 and 23 in a manner which allows a predetermined outward axial movement of the tire beads and sidewalls.

Various systems can provide for this. In the schematic system shown in FIGS. 4 and 5 coil springs 50 bias the rims inwardly. When sufficient air pressure is developed the tire beads 22 and 23 force the rims axially outwardly to the seated positions shown in FIG. 5.

It will be noted that ring 27 is free of the tire in FIG. 5 thereby avoiding any adhesion problems and opening larger air flow paths to expedite inflation and deflation.

In practice it has been found that a leather belt about one-quarter inch thick loosely surrounding the rims is most effective, its diameter being about one-eighth of an inch larger than the rim portions it surrounds. The belt may carry many minute holes or some small holes or just one large hole. Separate spacers (not shown)

positioned around the beads inside the tire have served the purpose which is to seat the tire beads to enable initial inflation for the establishment of a firm fluid tight seal against the rim bead flanges.

As mentioned, this invention is designed to provide a replacement kit for presently existing equipment. U.S. Pat. No. 2,866,228 is one type of equipment and its design has been changed to include camming of the locking ears for adjustment. The instant invention can be designed to operate on many types of equipment, those which utilize the inwardly biased rims and those which do not. The key features are the sealing of the rims and the initial sealing of the tire beads to the rims accomplished by spaced discrete elements, an open ring framework, a foraminous belt, the type belt with many small holes 80 shown in FIG. 1, a belt with a single hole 81 as shown in FIG. 1 and the like.

FIGS. 1 and 2 show the kit and it will be noted that valve 83 provides the means for introducing air directly into the tire through bead seater means 27. Air tubes 84 and 85 provide bead release means for separating the tire from the rims after retreading. It will be noted that the rims of U.S. Pat. No. 2,866,228 may be utilized by merely making the rim tubes airtight at the telescopic joint and adding the required inflation valve and bead seater means. The O-ring seal is preferred but other seals may be employed.

I claim:

1. Means for concentrically sealing and supporting the beads of a tire within a circular retreading mold comprising:

a pair of cylindrical rims having an annular bead flange extending radially outwardly and an annular tube portion extending laterally inwardly from its flange, the tube portions being in a telescoped relationship, one of said tube portions being longer than the other and one of said tube portions having an O-ring groove at its end;

an O-ring positioned in said groove to provide a fluid tight seal in the telescopic joint;

a bead seater ring of flexible material encircling said tube portions, said ring having radial faces for engagement with opposed inner portions of the beads of a tire, each radial face and its respective adjacent annular bead flange being adapted to sandwich their respective tire bead therebetween to provide a fluid seal, said bead seater ring having an opening for allowing fluid flow to enable inflation and deflation of the tire, said ring having an inside diameter greater than the outside diameter of the telescoped tube portions to provide an annular fluid conduit, a tire inflation valve means positioned in a tube portion between the O-ring seal and its bead flange, each rim having a fluid bead release means.

2. Means as defined in claim 1 and wherein the bead engaging faces of said rims have a coating of a material which inhibits adhesion of the beads thereto.

* * * * *

UNITED STATES PATENT OFFICE
CERTIFICATE OF CORRECTION

Patent No. 3,690,794　　　　　　　　　　Dated September 12, 1972

Inventor(s)　SHELLABARGER

It is certified that error appears in the above-identified patent and that said Letters Patent are hereby corrected as shown below:

Column 4, line 2, after "rims" insert --, each rim--

Signed and sealed this 23rd day of January 1973.

(SEAL)
Attest:

EDWARD M. FLETCHER, JR.　　　　　　ROBERT GOTTSCHALK
Attesting Officer　　　　　　　　　Commissioner of Patents